Oct. 30, 1956 R. TYLER 2,768,500
HYDRAULIC DRIVE
Filed May 20, 1955 3 Sheets-Sheet 2
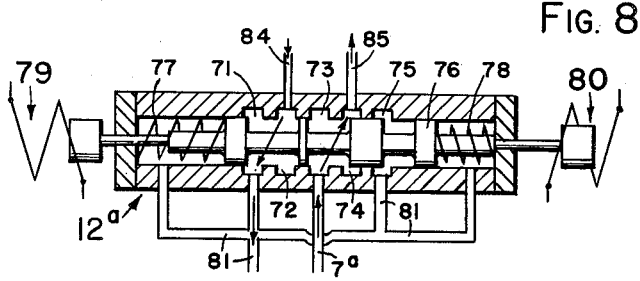
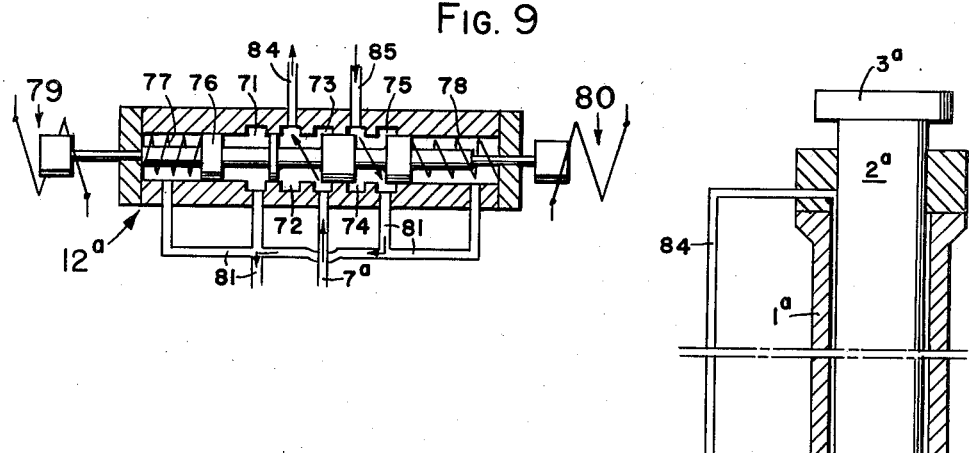
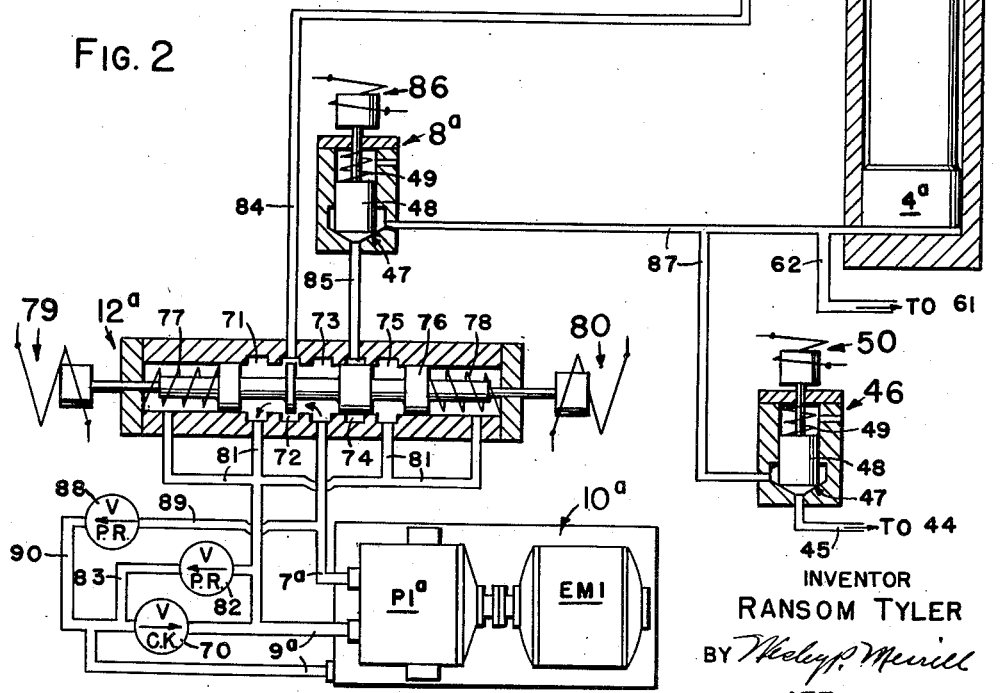
INVENTOR
RANSOM TYLER
BY *Wesley P. Merrill*
ATTORNEY Oct. 30, 1956  R. TYLER  2,768,500
HYDRAULIC DRIVE
Filed May 20, 1955  3 Sheets-Sheet 3
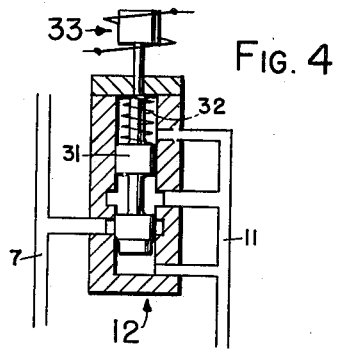
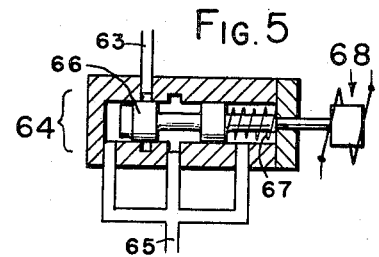
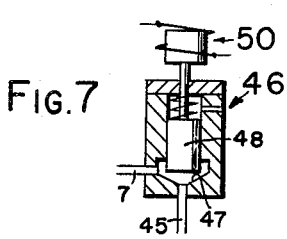
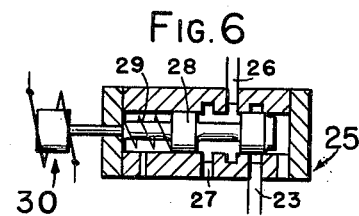
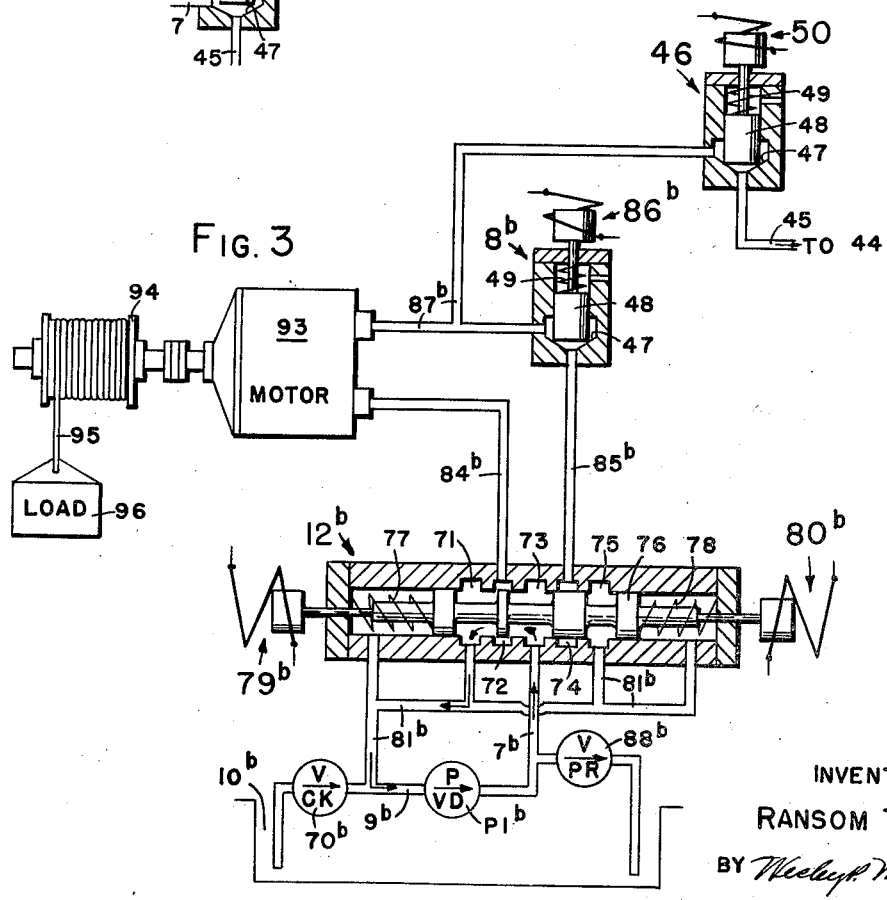
INVENTOR
RANSOM TYLER
ATTORNEY United States Patent Office 2,768,500
Patented Oct. 30, 1956

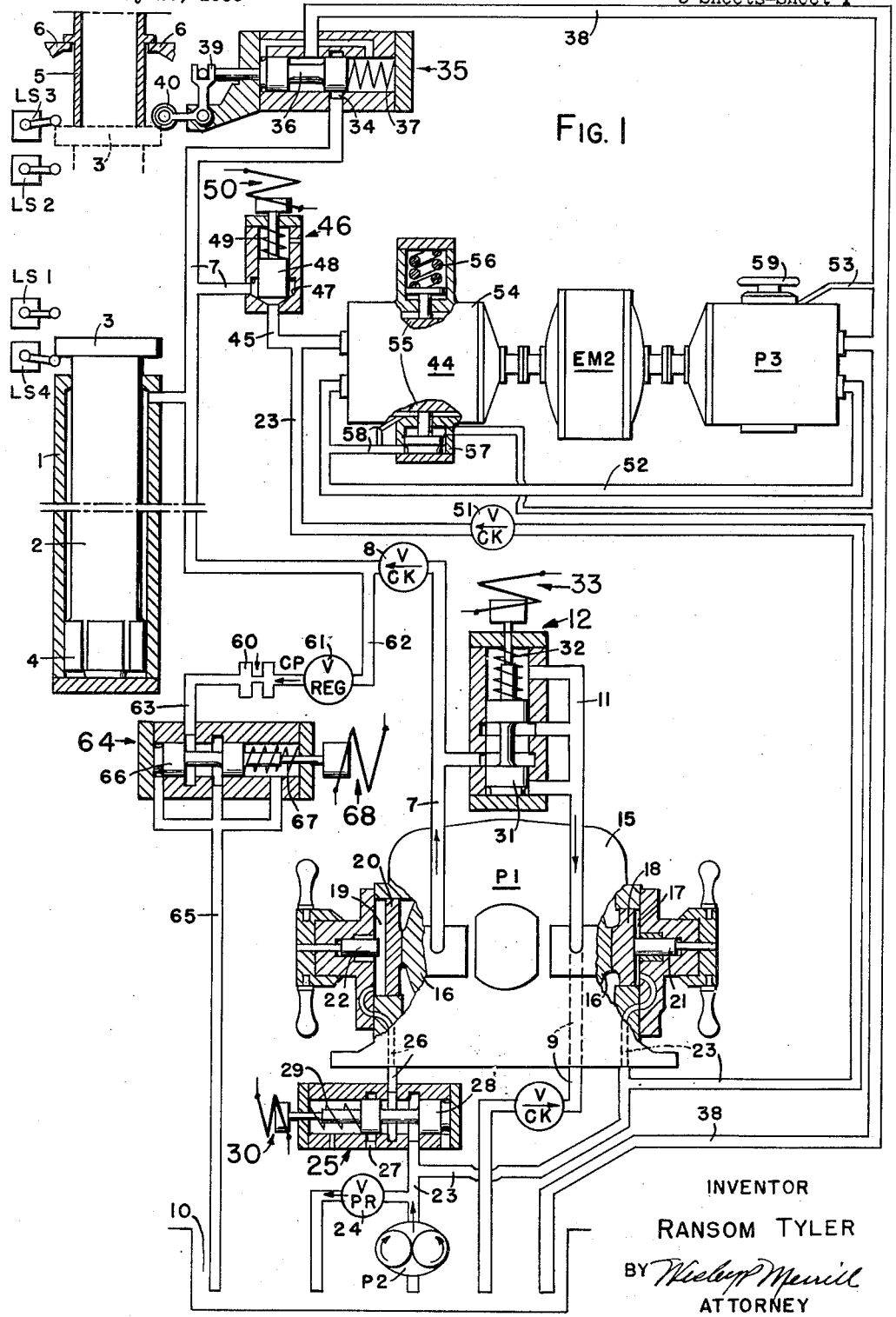

2,768,500

HYDRAULIC DRIVE

Ransom Tyler, Greenfield, Wis., assignor to The Oilgear Company, Milwaukee, Wis., a corporation of Wisconsin Application May 20, 1955, Serial No. 509,713

10 Claims. (Cl. 60—52)

This invention relates to hydraulic drives of the type having a hydraulic motor for moving a load in opposite directions selectively and a pump for supplying motive liquid to the motor to energize it.

A drive constructed according to the invention is particularly adapted for moving a load upward and for accurately controlling the speed of a load during downward movement thereof but the invention is not limited to vertically operating drives.

It is common practice to regulate the speed of a hydraulic motor by regulating the displacement of the pump which energizes it but, since a pump has as an inherent characteristic thereof an internal leakage or slip which varies in response to variations in pump pressure, the motor speed will vary somewhat in response to variations in the load on the motor.

It also is common practice to regulate the speed of a hydraulic motor by throttling the flow of liquid therefrom but in that case all of the energy in the liquid discharged from the motor is dissipated as heat at the throttle and, if the pressure in the motor is high, the liquid in the system soon becomes excessively heated.

The present invention has as an object to provide a hydraulic drive in which the speed of the motor during operation thereof in one direction is determined by the displacement of the pump and the speed of the motor during operation in the opposite direction is very accurately controlled without causing undue heating of the motive liquid.

Another object is to provide a hydraulic drive in which during operation of the motor in one direction the motor speed is very accurately controlled regardless of variations in the load on the motor or variations in the force or forces which urge the motor in that direction.

Other objects and advantages will appear from the description hereinafter given of hydraulic drives in which the invention is embodied.

According to the invention in its principal aspect, the speed of the motor in one direction of operation is determined by the displacement of the pump and the speed of the motor in the opposite direction of operation is very accurately controlled by passing the liquid discharged by the motor through a metering apparatus which is independent of the pump.

The invention is exemplified by the hydraulic drives shown schematically in the accompanying drawings in which the views are as follows:

Fig. 1 is a diagram of the hydraulic circuit of the drive for the ingot support of an aluminum casting machine.

Fig. 2 is a diagram of a portion of the hydraulic circuit of a hydraulic drive which is similar to that shown in Fig. 1 but which includes a double acting hydraulic motor instead of a single acting hydraulic motor as shown in Fig. 1.

Fig. 3 is a diagram of a portion of the hydraulic circuit of a hydraulic drive which is similar to that shown in Fig. 1 but which includes a rotary hydraulic motor instead of a reciprocating motor as shown in Fig. 1.

Figs. 4, 5, 6 and 7 are views showing valves in positions different from those shown in Fig. 1.

Figs. 8 and 9 are views showing a valve in positions different from that shown in Fig. 2.

A hydraulic drive embodying the invention includes a main hydraulic motor, a main pump for supplying motive liquid to the motor to effect operation thereof in at least one direction, means for controlling the flow of liquid from the pump to the motor, a variable displacement auxiliary motor which meters the outflow from the main motor during operation thereof in at least one direction, a variable displacement auxiliary pump which is connected in series with the auxiliary motor and meters the outflow therefrom, an electric motor which drives the auxiliary pump at a constant speed and is also connected to the auxiliary motor to assist in driving it or to be at least partially driven by the auxiliary motor, and a control which automatically adjusts the auxiliary motor to maintain the outflow therefrom exactly equal to the rate at which liquid can flow through the auxiliary pump.

Fig. 1.—The drive shown in this figure is employed to raise and lower the ingot support of an aluminum casting machine and it includes a reciprocating hydraulic motor comprising a vertical cylinder 1 which is arranged in a stationary position and a ram 2 which is fitted in cylinder 1 and has an ingot support 3 fixed to its upper end. Since motor 1—2 has a very long stroke, such as 20 feet, ram 2 must be prevented from tilting in cylinder 1 under the influence of an off-center load on support 3. As shown, ram 2 has a slotted guide piston 4 fixed on its lower end and closely fitted in cylinder 1.

In practice, a number of ingot molds are arranged directly above the ingot support 3 during the ingot casting operation and are supported by a carriage (not shown) which is adapted to move the molds into and out of vertical alinement with support 3. But in order to simplify the drawing, support 3 has been shown as being quite small and a single mold 5 has been shown arranged above support 3 and supported by two lugs 6 which represent parts of the aforementioned carriage.

Liquid for energizing motor 1—2 is supplied by main pump P1 which is driven by a suitable electric motor, such as the motor EM1 shown in Fig. 2, and it has its outlet connected to cylinder 1 by a delivery channel 7 having arranged therein a check valve 8 which permits liquid to flow freely from pump P1 to cylinder 1 but positively prevents flow in the opposite direction. The intake of pump P1 communicates with a suction channel 9 which extends into a reservoir 10 containing a supply of liquid. Reservoir 10 has been shown separate from pump P1 but in practice it constitutes a base upon which pump P1 is mounted. The intake of pump P1 also communicates with a channel 11 which is connected to a branch of channel 7 through a bypass valve 12 to be presently described.

Pump P1 has not been illustrated in detail because any suitable pump may be employed and the specific pump shown and actually used in the drive is well known as an "Oilgear DR pump" which has been in extensive commercial use for many years.

It is deemed sufficient to state herein that the mechanism of pump P1 is arranged within a casing 15 and includes a displacement varying member or slide block 16 which is continuously urged toward the left in respect to the drawing by a hydraulic servo-motor comprising a cylinder 17 which is carried by casing 15 and a piston 18 which engages slide block 16 and is fitted in cylinder 17, that slide block 16 is adapted to be moved toward the right against the resistance of servo-motor 17—18 by a larger servo-motor comprising a cylinder 19 which is carried by casing 15 and a piston 20 which engages slide block 16 and is fitted in cylinder 19, and that pump P1 when driven will draw liquid from reservoir 10 through channel 9 and will discharge it into channel 7 at a rate determined by the position of slide block 16. Movement of slide block 16 toward the right is limited by a stop 21 which is engaged by piston 18 and movement of slide block 16 toward the left is limited by a stop 22 which is engaged by piston 20. The pressure created by pump P1 is limited by a high pressure relief valve which is built into the pump and does not appear in the drawing.

The arrangement is such that, when servo-motor 19—20 is de-energized, servo-motor 17—18 (which is continuously energized) will move slide block 16 toward the left until piston 20 engages stop 22 at which time pump P1 will discharge liquid into channel 7 at a maximum rate as determined by the adjustment of stop 22 and, when servo-motor 19—20 is energized, it will move slide block 16 toward the right until piston 18 engages stop 21 at which time the pump P1 will discharge liquid into channel 7 at a minimum rate as determined by the adjustment of stop 21.

Liquid for energizing servo-motors 17—18 and 19—20 and for other purposes is supplied by a gear pump P2 which has been shown separate from pump P1 but in practice it is driven in unison with pump P1 and is arranged within the casing thereof as is customary. Pump P2 draws liquid from reservoir 10 and discharges it into a branched supply channel 23 one branch of which is connected directly to cylinder 17 so that servo-motor 17—18 is continuously energized when pump P2 is running. The liquid discharged by pump P2 in excess of requirements is exhausted into reservoir 10 through a relief valve 24 which enables pump P2 to maintain a low pressure in channel 23 and in cylinder 17.

The flow of liquid to and from servo-motor 19—20 is controlled by a valve 25 to which a second branch of channel 23 is connected. Cylinder 19 is connected by a channel 26 to valve 25 at a point between the second branch of channel 23 and an exhaust port 27. Valve 25 includes a plunger 28 which is shiftable to connect channel 26 either to channel 23 or to port 27. Plunger 28 is urged by a spring 29 to the position shown in Fig. 1 and it is connected to a solenoid 30 which when energized will shift it to the position shown in Fig. 6. Solenoid 30 is controlled by limit switches LS1 and LS2 which are so located that they are operated during upward movement of ram 2.

When valve plunger 28 is in the position shown in Fig. 1, gear pump pressure extends into cylinder 19 and enables piston 20 to hold slide block 16 in its minimum displacement position as shown. When solenoid 30 is energized, it will shift plunger 28 into the position shown in Fig. 6 to connect cylinder 19 to exhaust which will permit servo-motor 17—18 to shift slide block 16 into its maximum displacement position. Then when solenoid 30 is deenergized, spring 29 will shift plunger 28 into the position shown in Fig. 1 and permit gear pump liquid to enter cylinder 19 and cause piston 20 to shift slide block 16 into its minimum displacement position because piston 20 has a pressure area about twice that of piston 18.

Bypass valve 12 has a valve plunger 31 fitted in its casing to control communication between channel 11 and a branch of channel 7 which are connected to the valve casing at spaced apart points. In practice, valve 12 is hydraulically operated under the control of a solenoid operated pilot valve but, in order to avoid complicating the drawing, plunger 31 has been shown as being urged to its bypass position, as shown in Fig. 1, by a spring 32 and as being connected to a solenoid 33 which when energized will shift valve plunger 31 to a position in which it blocks communication between channels 7 and 11 as shown in Fig. 4.

The arrangement is such that, when pump P1 is running and valve 12 is in the position shown in Fig. 1, the liquid discharged by pump P1 will flow through channel 7, valve 12 and channel 11 back to the pump intake but, when solenoid 33 is energized and shifts valve 12 to the position shown in Fig. 4, the liquid discharged by pump P1 will flow through channel 7 into the upper end of cylinder 1 and then will flow through the space between ram 2 and the wall of cylinder 1 and through the slots in guide piston 4 into the lower end of cylinder 1 and raise ram 2.

Solenoid 33 is energized in response to operation of a manual switch (not shown) which will be referred to as the "up switch" because operating it effects an up stroke of ram 2. Solenoid 33 is de-energized in response to operation of limit switch LS3 which is so located that it will be operated in response to ram 2 reaching its upper limit. Deenergizing solenoid 33 in response to operation of switch LS3 causes valve 12 to return to the position shown in Fig. 1 and to bypass pump P1 but ram 2 cannot descend at this time because check valve 8 prevents ram 2 from ejecting liquid from cylinder 1.

In order to avoid any danger of ram 2 failing to stop at the end of its up stroke for any reason such as switch LS3 failing to effect return of valve 12 to its bypass position, means are provided for positively stopping ram 2 before it has moved a substantial distance above its normal upper limit. As shown, channel 7 is connected to a port 34 formed in the casing of a safety valve 35 having a valve plunger 36 fitted in its casing and urged by a spring 37 to the position shown in which position it blocks port 34. An exhaust channel 38 is connected to valve 35 at a point spaced from port 34 and discharges into reservoir 10. Plunger 36 is connected to one arm of a lever 39 which is pivoted intermediate its ends upon a stationary support and has a roller 40 journaled in its other arm and so located that it is operated in response to ram 2 overrunning its normal upper limit.

The arrangement is such that a slight movement of ram 2 above its normal upper limit will cause lever 39 to shift valve plunger 36 toward the right far enough to permit the entire discharge from pump P1 to flow through valve 35 and channel 38 into reservoir 10 but plunger 36 will throttle the flow through port 34 and thereby enable pump P1 to maintain sufficient pressure in cylinder 1 to support ram 2.

The combined weight of ram 2 and the load thereon is sufficient to cause ram 2 to create pressure in cylinder 1 and to descend when liquid can escape from cylinder 1. A down stroke of ram 2 is effected by metering liquid out of cylinder 1 through a meter-motor 44 and a meter-pump P3 which are connected in series. Meter-pump P3 is driven by a synchronous electric motor EM2 which is also connected to meter-motor 44.

The inlet of motor 44 is connected by a channel 45 to the outlet of a solenoid operated check valve 46 the inlet of which has a branch of channel 7 connected thereto. As shown, check valve 46 has an annular valve seat 47 arranged therein around its outlet and a valve plunger 48 is fitted therein and normally urged by a spring 49 against seat 47 to positively prevent any flow of liquid from channel 7 into motor 44 except during the down stroke of ram 2. The stem of plunger 48 is connected to a solenoid 50 which when energized will move plunger 48 away from seat 47 and permit liquid to flow from cylinder 1 into motor 44.

A branch of gear pump supply channel 23 having a check valve 51 arranged therein is connected to the inlet of motor 44, such as by being connected to channel 45, to enable gear pump P2 to keep the meter circuit filled with liquid and to maintain a low pressure at the inlet of motor 44 when valve 46 is closed, but when valve 46 is open, check valve 51 will prevent the pressure in channel 7 from extending to pump P2.

The outlet of motor 44 is connected by a channel 52 to the inlet of pump P3 and the outlet of pump P3 is connected to exhaust such as by having a branch of channel 38 connected thereto. Liquid which leaks out of the mechanism of pump P3 is drained out of the pump casing through a channel 53 shown as being connected to channel 38.

Motor 44 has not been illustrated in detail because it is a well known commercial type and may be similar to but smaller than pump P1. Its mechanism is arranged within a liquid tight casing 54 and includes a displacement varying member or slide block 55 which has been shown as being urged toward maximum displacement by spring 56 but it may be urged toward maximum displacement position by a servo-motor which is energized by pump P2 and which corresponds to servo-motor 17—18.

Slide block 55 is movable toward minimum displacement position by a hydraulic servo-motor 57 which is connected to channel 52 by a channel 58 so that servo-motor 57 will be operated and will reduce the displacement of motor 44 in response to motor 44 discharging more liquid than can enter pump P3. Casing 54 is completely filled with liquid and a branch of channel 58 communicates with the interior thereof so that all of the liquid leaking out of the mechanism of pump 44 into casing 54 must flow through pump P3 together with the liquid discharged by motor 44 into channel 52.

Pump P3 is the same as motor 44 except that its displacement is adjusted manually. As shown, pump P3 is provided with a handwheel 59 which may be turned to vary pump displacement but in some installations handwheel 59 is replaced with gearing driven by an electric motor which may be controlled from a remote point.

Electric motor EM2 and solenoid 50 are controlled in part by a switch (not shown) which will be referred to as the "down switch" because operation thereof initiates a down stroke of ram 2, and in part by a limit switch LS4 which is operated in response to ram 2 reaching a predetermined lower limit.

With ram 2 in its upper position, closing the "down" switch will cause motor EM2 and solenoid 50 to be energized. Energizing motor EM2 will cause it to drive pump P3 and energizing solenoid 50 will cause it to open check valve 46 as shown in Fig. 7, thereby permitting ram 2 to descend and to eject liquid from cylinder 1 through motor 44 and pump P3 to exhaust at a rate determined by the adjustment of pump P3 as will presently be explained.

If the electric power should fail during the down stroke of ram 2, pump P3 would stop and valve 46 would close and stop further downward movement of ram 2 unless means were provided to permit continued downward movement of ram 2 in the event of power failure. As shown, the drive is provided with a flow control valve comprising an orifice 60 and a pressure regulating valve 61 which maintains a constant pressure at the inlet of orifice 60 and has its inlet connected to channel 7 by a channel 62. The outlet of orifice 60 is connected by a channel 63 to a solenoid operated two-way valve 64 to which an exhaust channel 65 is connected at a point spaced from channel 63. Communication between channels 63 and 65 is controlled by a valve plunger 66 which is urged to the position shown in Fig. 1 by a spring 67 and is connected to a solenoid 68 which is connected across the line (not shown) through which electric energy is supplied to the drive.

The arrangement is such that when electric energy is supplied to the drive, solenoid 68 will be energized and will shift valve plunger 66 to the position shown in Fig. 5 in which position it blocks channel 63 so that no liquid can escape from channel 7 through valve 64. But if the power should fail during the down stroke of ram 2, solenoid 68 would be deenergized and permit spring 67 to shift plunger 66 to the position shown in Fig. 1 and then ram 2 can discharge liquid through valve 64 and continue downward at a rate which remains constant because valve 61 maintains constant the drop in pressure across orifice 60.

*Operation*

The parts are in the positions shown in Fig. 1 when the drive is idle. To start pump P1 operating, the electric motor which drives it is energized by closing a main switch (not shown) which also causes solenoid 68 to be energized and to shift valve 64 to the position shown in Fig. 5 so that liquid discharged by pump P1 or the liquid discharged by motor 1—2 during its down stroke cannot enter exhaust channel 65. Pump P1 will then discharge liquid at a limited rate through channel 7, valve 12 and channel 11 back to its intake. Gear pump P2, which is driven in unison with pump P1, will discharge through its relief valve 24 and will maintain a low pressure in channels 23 and 45 and in servo-motors 17—18 and 19—20. Since servo-motor 19—20 is the larger of the two, it will hold pump P1 at a minimum displacement.

Upward movement of ram 2 may then be initiated by closing the "up" switch (not shown) which causes solenoid 33 to be energized and to close valve 12, as shown in Fig. 4, which will cause the liquid discharged by pump P1 to flow through channel 7 into cylinder 1 and start ram 2 moving upward at a slow speed. Upward movement of ram 2 through a short distance effects operation of switch LS1 which causes solenoid 30 to be energized and to shift valve 25 to the position shown in Fig. 6, thereby connecting cylinder 19 to exhaust and permitting servo-motor 17—18 to increase the displacement of pump P1 with the resultant increase in the rate of pump delivery.

Then the liquid discharged by pump P1 will move ram 2 upward at a fast rate until it effects operation of switch LS2 which will cause solenoid 30 to be deenergized and permit valve 25 to return to the position shown in Fig. 1 so that liquid from gear pump P2 can enter servo-motor 19—20 and cause it to reduce the displacement of pump P1 to the predetermined minimum and thereby reduce the speed of ram 2 to a low rate.

Ram 2 will continue upward at a slow speed until ingot support 3 engages mold 5 at which time switch LS3 is operated to cause solenoid 33 to be deenergized and permit valve 12 to return to the position shown in Fig. 1 in which position pump P1 is bypassed and upward movement of ram 2 ceases. Ram 2 is supported in its upper position by the liquid in cylinder 1 which cannot escape therefrom because valves 8, 46 and 64 are closed.

With ram 2 in its upper position, molten aluminum may be poured into mold 5. When the metal reaches a given height in the mold, downward movement of ram 2 may be initiated by closing the "down" switch (not shown) which causes synchronous motor EM2 and solenoid 50 to be energized. Motor EM2 will drive meter-pump P3 and meter-motor 44 at a constant speed and solenoid 50 will open valve 46. Then ram 2 will descend and eject liquid from cylinder 1 through channel 7, valve 46 and channel 45 into motor 44 which will discharge liquid through channel 52 to pump P3. Since at this time motor 44 is at maximum displacement and pump P3 has been adjusted to a smaller displacement, all of the liquid discharged by motor 44 can not enter pump P3 and the excess will enter servo-motor 57 and cause it to almost instantly reduce the displacement of motor 44 until all of the liquid discharged by motor 44 and the case leakage of motor 44 can enter pump P3.

The pressure at the inlet of pump P3 is maintained at a constant low value which is less than 150 p. s. i. and is determined by the resistance of spring 56 or, if slide block 55 is urged toward maximum displacement by hydraulic servo-motor, the pressure at the inlet of pump P3 is determined by the pressure of the liquid supplied to that servo-motor. The pressure at the inlet of the pump P3 cannot exceed that value because an increase in pressure above that value would cause servo-motor 57 to reduce the displacement of motor 44 until the pressure was reduced to that value.

The case leakage of a pump or motor varies in accordance with variations in the drop in pressure across the pump or motor. Since the drop in pressure across pump P3 remains constant, the case leakage of pump P3 remains constant and, consequently, the rate of flow through pump P3 remains constant.

The combined weight of ram 2 and the load thereon causes pressure to be created in cylinder 1 and that pressure causes motor 44 to tend to drive electric motor EM2 beyond its synchronous speed. Therefore, all of the energy in the liquid expelled from cylinder 1, except the small amount in the low pressure liquid delivered to pump P3, is converted into work in trying to drive motor EM2 instead of being dissipated as heat as would be the case if the speed of ram 2 were controlled by ejecting the liquid from cylinder 1 through a throttle valve.

The pressure in cylinder 1, and consequently the drop in pressure across motor 44, will vary in accordance with variations in the number or the size of the ingots being cast at any one time and will continually increase as the ingot or ingots increase in length. Consequently, the case leakage of motor 44 will vary accordingly.

If case 54 of motor 44 were connected to drain as is customary, the downward speed of ram 2 would vary in accordance with the variations in the number or size of the ingots being cast and would gradually increase as the ingots increased in length unless the displacement of pump P3 were continuously adjusted during the pouring operation. But by passing both the liquid discharged by motor 44 and the case leakage of motor 44 through pump P3 the downward speed will remain constant at any adjustment of pump P3.

During the pouring operation, the metal solidifies in the lower part of mold 5 and the ingot passes downward through the mold as ram 2 moves downward. After the pouring operation is completed, ram 2 continues downward until after the upper end of the ingot is below mold 5 and then limit switch LS4 is operated to deenergize motor EM2 and solenoid 50 which will cause motor EM2 to decelerate to a stop and valve 46 to close instantly and stop further downward movement of ram 2. As motor EM2 decelerates, motor 44 will be supplied with liquid from channel 23. As soon as ram 2 stops, mold 5 may be moved out of the way and the ingot lifted off support 3. Thereafter mold 5 may be returned into pouring position and a second cycle of operations started.

*Fig. 2.*—If the combined weight of the ram and the initial load thereon is not great enough to create sufficient pressure to effect operation of the meter-motor or if it is desired to move the ram downward at rapid traverse speed, the drive may be modified by making the main motor double acting and providing means for directing liquid from the main pump to opposite ends of the main motor selectively as indicated in Fig. 2 in which only a part of the hydraulic circuit has been illustrated because that part which meters the flow of liquid from the main motor during the down stroke is unchanged. Since the drive is otherwise similar to the drive shown in Fig. 1, corresponding parts have been indicated by corresponding reference numerals with the exponent "a" added to the reference numerals applied to Fig. 2.

As shown, the drive has a double acting main motor comprising a stationary cylinder $1^a$ and a ram $2^a$ which carries an ingot support $3^a$ and has a piston $4^a$ fixed on its lower end and closely fitted in cylinder $1^a$. Liquid for energizing motor $1^a$—$2^a$ is supplied by a pump $P1^a$ which is driven by an electric motor EM1 and is mounted upon a reservoir $10^a$ containing a supply of liquid. Pump $P1^a$, which has been indicated as being the same as the pump P1 previously described, is adapted to draw liquid from reservoir $10^a$ through a channel $9^a$ having a check valve 70 arranged therein and to discharge liquid into a channel $7^a$.

Delivery of liquid from pump $P1^a$ to motor $1^a$—$2^a$ is controlled by a valve $12^a$ having five annular grooves or ports 71, 72, 73, 74 and 75 formed in its casing and a valve plunger 76 fitted in its casing to control the flow of liquid therethrough. In practice, valve $12^a$ is hydraulically operated under the control of a solenoid operated pilot valve but, in order to simplify the drawing, plunger 76 has been shown as being centered by two springs 77 and 78 and as being shiftable in one direction or the other by one or the other of two solenoids 79 and 80.

Ports 71 and 75 communicate with a branched channel 81 which is connected to the intake of pump $P1^a$ such as by being connected to channel $9^a$. Channel 81 also communicates through a low pressure resistance valve 82 with a channel 83 which discharges into reservoir $10^a$ and has been shown as being connected to channel $9^a$. Port 72 is connected by a channel 84 to the upper end of cylinder $1^a$. Port 73 has channel $7^a$ connected thereto. Port 74 is connected by a channel 85 to the inlet of a check valve $8^a$ which corresponds to the check valve 8 of Fig. 1 but is adapted to be opened by a solenoid 86. Check valve $8^a$ is identical to the check valve 46 of Fig. 1 and the parts thereof have been indicated by the same reference numerals. The outlet of check valve $8^a$ is connected by a channel 87 to the lower end of cylinder $1^a$.

A branch of channel 87 is connected to the solenoid operated check valve 46 which forms a part of the metering apparatus shown in Fig. 1 and is connected to the meter-motor 44 thereof by a channel 45.

The arrangement is such that, when the parts are in the positions shown in Fig. 2 and pump $P1^a$ is started by energizing motor EM1, pump $P1^a$ will be bypassed through channel $7^a$, valve $12^a$ and channels 81 and $9^a$. To effect an upstroke of the main motor, solenoid 80 is energized and will shift valve plunger 76 to the position shown in Fig. 8. Then the liquid discharged by pump $P1^a$ will flow through channel $7^a$, valve $12^a$, channel 85 and raise the plunger 48 of valve $8^a$ and then flow through valve $8^a$ and channel 87 into the lower end of cylinder $1^a$ and cause ram $2^a$ to move upward. The main motor may be controlled during the upstroke in the same manner that the main motor of the drive shown in Fig. 1 is controlled.

When ram $2^a$ reaches its upper limit, solenoid 80 is deenergized in response to operation of a limit switch (not shown) corresponding to the limit switch LS3 of Fig. 1. Deenergizing solenoid 80 permits spring 78 to return valve plunger 76 to the position shown in Fig. 2 and thereby bypass pump $P1^a$. Since valves $8^a$ and 46 are closed at this time, ram $2^a$ will remain at its upper limit until motor EM2 (Fig. 1) and the solenoid 50 are energized. Motor EM2 will drive pump P3 and solenoid 50 will open valve 46. Then if the combined weight of ram $2^a$ and the load thereon is great enough to create sufficient pressure to effect operation of meter-motor 44 (Fig. 1), ram $2^a$ will descend and its rate of descent will be accurately controlled as previously explained.

But if the combined weight of ram $2a$ and the load thereon is not great enough to enable ram $2^a$ to eject liquid from cylinder $1^a$ through the metering apparatus, solenoid 79 may be energized and shift valve plunger 76 into the position shown in Fig. 9. Then liquid will flow from pump $P1^a$ through channel $7^a$, valve $12^a$ and channel 84 to the upper end of cylinder 1 and assist in moving ram $2^a$ downward. Pump $P1^a$ at this time is at short stroke and is adjusted to discharge liquid at a rate slightly in excess of the rate at which liquid can enter cylinder $1^a$ and the excess liquid is exhausted through the pump high pressure relief valve which in practice is built into the pump but which has been represented by a relief valve 88 having its inlet connected to channel $7^a$ by a channel 89 and its outlet connected to channel $9^a$ by a channel 90. The liquid discharged from cylinder $1^a$ is prevented from entering valve $12^a$ by check valve $8^a$. Solenoid 79 may be deenergized to permit valve plunger 76 to return to the position shown in Fig. 2 and bypass pump $P1^a$ at any time that the load on ram $2^a$ becomes great enough to cause ram $2^a$ to descend without the assistance of pump $P1^a$.

Whenever it is desired to move ram $2^a$ downward at high speed, solenoids 79 and 86 may be energized. Solenoid 79 will shift valve plunger 76 into the position shown in Fig. 9 and then liquid will flow from pump P1ª to the upper end of cylinder 1ª and move ram 2ª downward as explained above. Solenoid 86 will open valve 8ª to permit the liquid expelled by ram 2ª from cylinder 1ª to flow through channel 87 and valve 8ª into channel 81. Enough of that liquid to supercharge pump P1ª will flow from channel 81 through channel 9ª into the pump intake and the remainder of that liquid will flow from channel 81 through low pressure resistance valve 82 and channels 83 and 9ª into reservoir 10ª.

*Fig. 3.*—The drive shown in this figure is substantially the same as the drive shown in Fig. 2 except that, instead of having a reciprocating hydraulic main motor, it has a rotary hydraulic main motor 93 which has been shown as being connected to a drum 94 having a cable 95 wound thereon and connected to a load 96. Consequently, like parts have been indicated by like reference numerals and corresponding parts have been indicated by corresponding reference numerals of which the numerals applied to Fig. 3 have the exponent "*b*."

Liquid for energizing motor 93 is supplied by a pump P1ᵇ which draws liquid from a reservoir 10ᵇ through a channel 9ᵇ having a check valve 70ᵇ therein and discharges it into a channel 7ᵇ. The pressure created by pump P1ᵇ is limited by a relief valve 88ᵇ which is connected to channel 7ᵇ and discharges into reservoir 10ᵇ.

Flow of liquid from pump P1ᵇ to motor 93 is controlled by a valve 12ᵇ which is identical to the valve 12ª of Fig. 2 and is adapted to have its plunger 76 shifted to the position shown in Fig. 8 by a solenoid 80ᵇ and to the position shown in Fig. 9 by a solenoid 79ᵇ. Valve 12ᵇ has its ports 71 and 75 connected by a channel 81ᵇ to channel 9ᵇ its port 72 connected by a channel 84ᵇ to one port of motor 93, its port 73 connected to channel 7ᵇ, and its port 74 connected by channel 85ᵇ to a check valve 8ᵇ which is connected to the other port of motor 93 by a channel 87ᵇ. Check valve 8ᵇ, which is identical to the check valve 8ª of Fig. 2, is adapted to be opened either by the flow of liquid into it from channel 85ᵇ or by a solenoid 86ᵇ. A branch of channel 87ᵇ is connected to the solenoid operated check valve 46 which forms a part of the metering apparatus shown in Fig. 1 and which is connected to the meter-motor 44 thereof by a channel 45.

The arrangement is such that, when the parts are in the positions shown in Fig. 3 and pump P1ᵇ is running, the liquid discharged by pump P1ᵇ will flow through channel 7ᵇ, valve 12ᵇ and channels 81ᵇ and 9ᵇ back to the intake of the pump but load 96 cannot descend and drive motor 93 because valve 8ᵇ is closed and prevents any discharge of liquid from motor 93.

If it is desired to move load 96 downward at a fast rate, solenoids 79ᵇ and 86ᵇ may be energized. Solenoid 86ᵇ will open valve 8ᵇ and solenoid 79ᵇ will shift the plunger 76 of valve 12ᵇ to the position shown in Fig. 9. Then the liquid discharged by pump P1ᵇ will flow through channel 7ᵇ, valve 12ᵇ and channel 84ᵇ to motor 93 and cause or permit it to rotate in a direction to effect downward movement of load 96 and the liquid discharged by motor 93 will flow through channel 87ᵇ, valve 8ᵇ, channel 85ᵇ, valve 12ᵇ and channels 81ᵇ and 9ᵇ into pump P1ᵇ. The speed at which load 96 moves downward is thus determined by the displacement of pump P1ᵇ regardless of whether motor 93 is driven by pump P1ᵇ or by load 96. Downward movement of load 96 may be stopped at any point by deenergizing solenoids 79ᵇ and 86ᵇ which causes valves 12ᵇ and 8ᵇ to return to the position shown in Fig. 3.

When solenoid 80ᵇ is energized, it will shift the plunger 76 of valve 12ᵇ into the position shown in Fig. 8 and then the liquid discharged by pump P1ᵇ will flow through channel 7ᵇ, valve 12ᵇ, channel 85ᵇ into valve 8ᵇ and raise its plunger 48 and then flow through channel 87ᵇ into motor 93 and cause it to rotate in a direction to raise load 93. The liquid discharged my motor 93 will flow through channel 84ᵇ, valve 12ᵇ, and channels 81ᵇ and 9ᵇ back to pump P1ᵇ. Load 96 will continue upward until solenoid 80ᵇ is deenergized to permit valve plunger 76 to return to the position shown in Fig. 3 and stop further movement of load 96.

To effect downward movement of load 96 at an accurately regulated speed, solenoid 50 and motor EM2 (Fig. 1) are energized. Solenoid 50 will open check valve 46 and motor EM2 will drive meter-pump P3 (Fig. 1). Then if load 96 is heavy enough to drive motor 93 and cause it to create sufficient pressure to effect operation of the metering apparatus shown in Fig. 1, motor 93 will draw liquid from reservoir 10ᵇ through check valve 70ᵇ, channels 9ᵇ and 81ᵇ, valve 12ᵇ and channel 84ᵇ and will discharge it through channel 87ᵇ, check valve 46 and channel 45 into meter-motor 44 and the metering apparatus will meter the outflow from motor 93 and thereby accurately control the speed of the main motor and the rate of movement of its load as previously explained.

But if load 96 is not heavy enough to cause motor 93 to create sufficient pressure to effect operation of the metering apparatus, solenoid 79ᵇ may be energized and shift valve plunger 76 into the position shown in Fig. 9. Then pump P1ᵇ will be supplied with liquid through channel 9ᵇ and check valve 70ᵇ from reservoir 10ᵇ and the liquid discharged by pump P1ᵇ will flow through channel 7ᵇ, valve 12ᵇ and channel 84ᵇ into motor 93 and assist in moving load 96 downward. Since the rate at which motor 93 discharges liquid is limited by the metering apparatus, pump P1ᵇ will discharge liquid in excess of that which can flow through motor 93 and the excess liquid is exhausted through relief valve 88ᵇ.

In each of Figs. 2 and 3, the main pump has been indicated as being unidirectional and the flow control means has been shown as being a control valve but either of the drives may be provided with a reversible pump in which case the reversing mechanism of the pump would constitute the flow control means and would be controlled by solenoids corresponding to solenoids 79 and 80.

Since a reversible pump is recognized as the equivalent of a unidirectional pump and a reversing valve and since electrically controlled reversible pumps are well known and in extensive commercial use, it is deemed unnecessary to illustrate an embodiment of the invention powered by a reversible pump.

Thus far, a unidirectional pump and a reversing valve have been preferred but, if it were desired to provide an embodiment of the invention having a reversible pump and to supply liquid to the motor at different rates during operation of the motor in either direction, a pump similar to that shown in Patent No. 2,702,007 may be employed.

The hydraulic drive may be modified in other ways and adapted to other uses without departing from the scope of the invention which is hereby claimed as follows:

1. In a hydraulic drive having a main hydraulic motor operable in opposite directions, a first fluid channel connected to said motor, and means for effecting operation of said motor including a main pump connected to said channel and control means operable either to permit liquid to flow from said pump through said channel to said motor and cause it to operate in one direction or to cut off said flow of liquid through said channel to said motor, the combination of an electric motor, a meter-pump driven by said electric motor and having its outlet connected to exhaust, a meter-motor connected to said electric motor and having a displacement varying member urged in a direction to increase motor displacement and a hydraulic servo-motor for moving said member in the opposite direction to decrease motor displacement, a second channel connecting the outlet of said meter-motor to the inlet of said meter-pump and to said servo-motor, a third channel connecting the inlet of said meter-motor to said first channel, a normally closed valve arranged in said third channel to prevent flow of liquid from said first channel into said meter-motor during operation of said main motor in said one direction, and means for opening said normally closed valve to permit liquid discharged from said main motor during operation thereof in the opposite direction to flow through said third channel, said meter-motor, said second channel and said meter-pump to exhaust and the liquid flowing from said meter-motor in excess of the liquid which can enter said meter-pump to enter said servo-motor and cause it to reduce the displacement of said meter-motor until the liquid passing through it is equal to the liquid which can pass through said meter-pump.

2. A hydraulic drive according to claim 1, in which said meter-motor has a casing which encloses the mechanism thereof and is filled with liquid, and the interior of said casing is connected to said second channel so that said meter-pump meters both the discharge and the case leakage of said meter-motor.

3. A hydraulic drive comprising a main hydraulic motor hydraulically operable in at least one direction and urged in the opposite direction by an external force, a first fluid channel connected to said motor, means for effecting operation of said motor including a main pump connected to said channel and control means operable either to permit liquid to flow from said pump through said channel to said motor and cause it to operate in one direction or to cut off said flow of liquid through said channel to said motor, a meter-motor having its inlet connected to said channel, said meter-motor having a displacement varying member urged in a direction to increase motor displacement and a hydraulic servo-motor for moving said member in the opposite direction to decrease motor displacement, a constant speed electric motor connected to said meter-motor, a meter-pump driven by said electric motor and having its outlet connected to exhaust, a second channel connecting the outlet of said meter-motor to the inlet of said meter-pump and to said servo-motor, a normally closed valve connected between the inlet of said meter-motor and said first channel to prevent flow of liquid from said first channel into said meter-motor during operation of said main motor in said one direction, and means for opening said normally closed valve to permit liquid discharged from said main motor during operation thereof in the opposite direction to flow through said meter-motor and cause it to tend to drive said electric motor beyond its rated speed and thereby dissipate a large part of the energy in said liquid, to discharge said liquid through said second channel and said meter-pump to exhaust, and to at first discharge liquid faster than it can enter said meter-pump and thereby cause liquid to enter said servo-motor and cause it to reduce the displacement of said meter-motor until the liquid passing through it is equal to the liquid which can pass through said meter-pump.

4. A hydraulic drive according to claim 3 and including a normally open emergency valve connected between said first channel and exhaust, a constant pressure valve and a throttle connected in series with each other and with said emergency valve, and electrically operated means holding said emergency valve closed during the time said drive is operating normally, said emergency valve having a spring which in response to failure of the electric power for said drive will open said emergency valve to permit said main motor to discharge therethrough and through said constant pressure valve and said throttle.

5. A hydraulic drive according to claim 3 in which said meter-motor has a casing which encloses the mechanism therof and is filled with liquid, and the interior of said casing is connected to said second channel so that said meter-pump meters both the discharge and the case leakage of said meter-motor.

6. A hydraulic drive comprising a gravity return main motor having a cylinder arranged vertically in a stationary position and a ram fitted in said cylinder, a main pump for supplying liquid to said cylinder to cause said ram to move upward, a first channel connecting said cylinder to the outlet of said pump, control means operable either to direct a flow of liquid from said pump through said channel to said cylinder or to cut off said flow, a meter-motor having its inlet connected to said channel, said meter-motor having a displacement varying member urged in a direction to increase motor displacement and a hydraulic servo-motor for moving said member in the opposite direction to decrease motor displacement, a constant speed electric motor connected to said meter-motor, a meter-pump driven by said electric motor and having its outlet connected to exhaust, a second channel connecting the outlet of said meter-motor to the inlet of said meter-pump and to said servo-motor, a normally closed valve connected between the inlet of said meter-motor and said first channel to prevent flow of liquid from said first channel to said meter-motor during the up stroke of said ram, and means for opening said normally closed valve to permit said ram to descend and eject liquid from said cylinder through said meter-motor and cause it to tend to drive said electric motor beyond its rated speed and thereby dissipate a large part of the energy in said liquid, to discharge said liquid through said second channel and said meter-pump to exhaust, and to at first discharge liquid faster than it can enter said meter-pump and thereby cause liquid to enter said servo-motor and cause it to reduce the displacement of said meter-motor until the liquid passing through it is equal to the liquid which can pass through said meter-pump.

7. A hydraulic drive according to claim 6 in which said meter-motor has a casing which encloses the mechanism thereof and is filled with liquid, and the interior of said casing is connected to said second channel so that said meter-pump meters both the discharge and the case leakage of said meter-motor.

8. A hydraulic drive according to claim 6 and including a normally open emergency valve connected between said first channel and exhaust, a constant pressure valve and a throttle connected in series with each other and with said emergency valve, and electrically operated means holding said emergency valve closed during the time said drive is operating normally, said emergency valve having a spring which in response to failure of the electric power for said drive will open said emergency valve to permit said main motor to discharge therethrough and through said constant pressure valve and said throttle.

9. A hydraulic drive comprising a hydraulic motor having a first port and a second port, a main pump, a first channel means connecting said first port to said pump, a second channel means connecting said second port to said pump, flow control means connected to said pump and normally occupying a neutral position in which it cuts off flow of liquid to said motor, means connected to said flow control means for adjusting the same to cause it to direct liquid from said pump through said first channel means to said first port to effect operation of said motor in one direction, means connected to said flow control means for adjusting the same to cause it to direct liquid from said pump through said second channel means to said second port to effect operation of said motor in the opposite direction, a valve arranged in said first channel means and normally blocking flow of liquid from said motor to said pump, means connected to said valve for opening it, a meter-motor having its inlet connected to said first channel means, said meter-motor having a displacement varying member urged in a direction to increase motor displacement and a hydraulic servo-motor for moving said member in the opposite direction to decrease motor displacement, a constant speed electric motor connected to said meter-motor, a meter-pump driven by said electric motor and having its outlet connected to exhaust, a channel connecting the outlet of said meter-motor to the inlet of said meter-pump and to said servo-motor, a normally closed valve connected between the inlet of said meter-motor and said first channel means to prevent flow of liquid from said first channel means into said meter-motor during operation of said main motor in said one direction, and means for opening said normally closed valve to permit liquid discharged from said main motor during operation thereof in the opposite direction to flow through said meter-motor and cause it to tend to drive said electric motor beyond its rated speed and thereby dissipate a large part of the energy in said liquid, to discharge said liquid through said second channel, and said meter-pump to exhaust, and to at first discharge liquid faster than it can enter said meter-pump and thereby cause liquid to enter said servo-meter and cause it to reduce the displacement of said meter-motor until the liquid passing through it is equal to the liquid which can pass through said meter-pump.

10. A hydraulic drive according to claim 9 in which said meter-motor has a casing which encloses the mechanism thereof and is filled with liquid, and the interior of said casing is connected to said second channel so that said meter-pump meters both the discharge and the case leakage of said meter-motor.

No references cited.